US006842196B1

(12) United States Patent
Swift et al.

(10) Patent No.: US 6,842,196 B1
(45) Date of Patent: Jan. 11, 2005

(54) METHOD AND SYSTEM FOR AUTOMATIC CORRECTION OF MOTION ARTIFACTS

(75) Inventors: Dana Swift, Tulsa, OK (US); Larry Birdsill, Oklahoma City, OK (US)

(73) Assignee: Smith & Nephew, Inc., Memphis, TN (US)

( * ) Notice: Subject to any disclaimer, the term of this patent is extended or adjusted under 35 U.S.C. 154(b) by 0 days.

(21) Appl. No.: 09/542,611

(22) Filed: Apr. 4, 2000

(51) Int. Cl.$^7$ .............................. H04N 5/21; H04N 7/01
(52) U.S. Cl. ........................ 348/452; 348/451; 348/700; 348/620; 348/701; 382/236; 375/240.16
(58) Field of Search ........................ 348/701, 700, 348/699, 620, 451, 452, 413.1, 416.1, 65, 208.4, 45, 208.13, 72, 559, 208.16, 220.1, 241, 352; 382/236, 237, 107, 275; 375/240.16, 240.15, 240.27; 358/463

(56) References Cited

U.S. PATENT DOCUMENTS

| | | | |
|---|---|---|---|
| 4,799,105 A | 1/1989 | Mitchell et al. | ............. 358/160 |
| 5,005,126 A | 4/1991 | Haskin | ................... 364/413.13 |
| 5,016,102 A * | 5/1991 | Avis | ............................ 348/452 |
| 5,099,846 A | 3/1992 | Hardy | ...................... 128/653.1 |
| 5,191,413 A | 3/1993 | Edgar | .......................... 358/105 |
| 5,212,637 A | 5/1993 | Saxena | ................... 364/413.26 |
| 5,278,756 A | 1/1994 | Lemchen et al. | ...... 364/413.28 |
| 5,293,313 A | 3/1994 | Cecil et al. | ............. 364/413.22 |
| 5,329,317 A | 7/1994 | Naimpally et al. | ......... 348/620 |
| 5,415,167 A | 5/1995 | Wilk | ........................ 128/653.1 |
| 5,430,480 A * | 7/1995 | Allen et al. | ............... 348/208.4 |
| 5,446,501 A | 8/1995 | Takemoto et al. | ........... 348/620 |
| 5,510,834 A * | 4/1996 | Weiss et al. | .................... 348/97 |
| 5,579,054 A * | 11/1996 | Sezan et al. | ................. 348/452 |
| 5,605,531 A | 2/1997 | Lane et al. | .................. 600/118 |
| 5,625,421 A | 4/1997 | Faroudja et al. | ............ 348/607 |
| 5,666,953 A | 9/1997 | Wilk | ........................ 128/653.1 |
| 5,682,205 A * | 10/1997 | Sezan et al. | ................. 348/452 |
| 5,740,801 A | 4/1998 | Branson | ................... 128/653.1 |
| 5,784,115 A | 7/1998 | Bozdagi | |
| 5,844,613 A * | 12/1998 | Chaddha | ................ 375/240.12 |
| 5,852,475 A | 12/1998 | Gupta et al. | ................. 348/606 |
| 5,877,819 A | 3/1999 | Branson | ...................... 348/701 |
| 5,878,746 A | 3/1999 | Lemelson et al. | ........ 128/653.1 |
| 5,903,319 A | 5/1999 | Busko et al. | ................ 348/607 |
| 5,920,317 A | 7/1999 | McDonald | .................... 345/356 |
| 6,115,502 A * | 9/2000 | De Haan et al. | ............. 382/260 |
| 6,205,178 B1 * | 3/2001 | Suzuki et al. | ........... 375/240.15 |
| 6,252,975 B1 * | 6/2001 | Bozdagi et al. | ............. 382/107 |
| 6,269,484 B1 * | 7/2001 | Simsic et al. | ................ 725/151 |
| 6,545,719 B1 * | 4/2003 | Topper | ........................ 348/448 |
| 6,580,812 B1 * | 6/2003 | Harrington | ................... 382/107 |
| 6,628,711 B1 * | 9/2003 | Mathew et al. | ......... 375/240.12 |

OTHER PUBLICATIONS

Patti, A.J., Sezan, M.I., and Tekalp, A.M., Robust Methods for High–Quality Stills from Interlaced Video in the Presence of Dominant Motion, IEEE Transactions on Circuits and Systems For Video Technology, vol. 7, No. 2, pp. 328–342, Apr. 1997.

* cited by examiner

Primary Examiner—Michael H. Lee
Assistant Examiner—Jean W. Désir
(74) Attorney, Agent, or Firm—Kilpatrick Stockton LLP

(57) ABSTRACT

Methods and systems of the present invention automatically and differentially detect and correct linear motion artifacts caused by camera movement and regional subject motion artifacts. Regional subject motion artifacts may be caused, for example in endoscopic or other surgery, by movement of surgical tools or the patient within the image field. Methods and systems of the present invention automatically correct for both types of motion occurring simultaneously. After an image is automatically corrected for both camera motion and regional subject motion, the image is displayed for viewing.

16 Claims, 9 Drawing Sheets

METHOD AND SYSTEM FOR AUTOMATIC CORRECTION OF MOTION ARTIFACTS

FIELD OF THE INVENTION

The present invention relates to methods and systems for improving interlaced video and images taken from endoscopic or other surgery, sports still frames, or other video. In particular, the methods and systems of the present invention relate to improving interlaced video and images in which the image recording device, subject, or both are moving independently. The present invention more particularly relates to methods and systems for automatically correcting artifacts caused by camera motion and artifacts caused by subject motion.

BACKGROUND OF THE INVENTION

Television and video technology has long relied on trickery to fool the human eye into believing that the television or video signal accurately reflects the events occurring. For instance, conventional video technology such as the NTSC (National Television Standards Committee) standard uses "interlaced video," in which a single image or frame comprises two fields that are taken $\frac{1}{60}$ second apart. Each frame contains 525 scan lines divided into two fields. The first, or odd, field comprises the odd numbered lines (e.g., 1, 3, ... 525) while the second, even field forms the even numbered lines (e.g., 2, 4, ... 524). These two fields, during display of the frame they form, are interlaced so that the odd numbered scan lines are inserted between the even numbered scan lines, much like the interlacing that would occur when one interlaces the fingers of one hand with the fingers of another. Since each frame comprises two interlaced fields (even and odd) each captured $\frac{1}{60}$ second apart, the frames themselves are captured at a rate of 30 frames per second.

In most video applications, the very short delay ($\frac{1}{60}$ second) between capture of fields means that even if the subject moves during filming, any artifacts of motion will be virtually undetectable. (An example of motion artifacts can be seen in old silent movies, which operated at fairly low frame speeds.) The high rate at which the recorder captures frames and the slight time separation between the fields within each frame results in minimal blurring in the video. Even when the subject being video-recorded is in motion, for example, a moving car or a runner, such motion artifact will be substantially undetectable to the human eye in the captured frame. Additional, in many applications, humans tend to ignore even detectable motion artifacts in video because a particular motion artifact (for example, blurring because of subject movement) is often quickly replaced with another frame or series of frames missing that artifact. Thus, in some applications, the speed of frame capture and the continual refreshment of interlaced fields is sufficient to avoid noticeable blurring of video images.

However, in many applications, the rate at which fields are scanned and frames are captured is not sufficiently high to prevent motion artifacts from causing image distortion problems in the displayed video. Applications in which image distortion problems may be caused by motion artifacts include, for example, video and images taken from endoscopic or other surgery, sports still frames, or other video in which the camera and subject are moving independently. U.S. Pat. No. 5,191,413 to Edgar gives a practical example of this. Edgar states that "if a subject were to move a hand during the capturing process, sequential fields will be generated which will capture the hand in two distinctly different positions. However, operation of typical interlace systems call for the two fields to be continuously refreshed alternately on the display screen. The results of this may be the appearance of the hands engaging in a jittery or shaking motion at the frequency of 30 times a second giving rise to highly undesirable images." This phenomenon is also illustrated in U.S. Pat. No. 5,329,317 to Naimpally, et al.

These motion artifacts are particularly pronounced when the video in question has been magnified. For example, videos are often taken and magnified in endoscopic or laparoscopic surgery. Video images are taken by a high resolution camera coupled to an endoscope optic or laparoscope optic. Such images are magnified tremendously by the scope optic and, as a result, the captured images are extremely sensitive to motion. Thus, a small movement in an image field results in a much larger change in the viewed field, and such magnified motion appears to be more global than local. In addition, because of this magnification, such motion is exaggerated by the time separation between the two field components of the captured frame.

Motion effects in captured frames are created in at least two different ways, each of the at least two ways resulting in different types of motion artifact. One type of motion effect is generated by movement of the endoscope camera by the surgeon. Endoscope movement can result in a "uniform motion-related error" between the odd and even fields. This type of motion effect is known generally as "linear artifact." As both fields are captured, endoscope movement causes a nearly identical image to be shifted in direct proportion to the velocity of endoscope movement, thus producing linear artifact. A second type of motion effect is created by movement within the image field of the camera. Such motion may be due to movement of surgical tools by the surgeon or by movement of the patient, such as with breathing. This type of motion effect is localized to the region of the image in which movement of the surgical tools or the patient tissue is being viewed, and is known as "regional artifact." The substantial magnification by the endoscope or laparoscope optic exacerbates the distorting effect of motion in a captured image caused by both linear artifacts and regional artifacts.

In sensitive applications, such as surgery, it is important to provide the most stable and artifact-free image possible. Efforts have been made in the past to correct for these motion artifacts. For example, video printers available from manufacturers such as Sony have "motion check" firmware. That firmware looks for motion artifacts developed within a particular image and alerts the user when it finds them. The user can then correct for the motion artifact. The correction usually involves dropping one of the two fields forming the image, which greatly reduces the vertical resolution of the video being displayed or printed. Another conventional technique for correcting for motion is to drop one of the two fields and replace the discarded field by repeating the remaining field. This results in an image that exaggerates only half the captured information, resulting in lower resolution. Also, some commercial software applications have motion correction features that can be performed by the user, although the features are often difficult to implement by those not technically versed in its use. Adobe has such software.

Another approach to correcting for motion artifacts has been to compare the difference between pixels in two adjacent fields to a fixed threshold value. If the threshold is exceeded, then the value in one pixel is replaced. The replacement value may be determined by averaging the value of pixels in adjacent lines. If, however, the difference between pixels does not exceed the fixed threshold, no action is taken to change a pixel value. This process is repeated for each pixel in each line of each frame. An example of this approach as applied to motion artifacts within an endoscopic image field is described in U.S. Pat. No. 5,877,819 to Branson.

Conventional methods for correcting for motion artifacts in highly magnified videos do not result in the highest quality picture. Moreover, they often require users with specialized skills, and lack flexibility. Thus, there is a need for a method and system for correcting for motion artifacts in highly magnified videos that yields a high resolution image. There is also a need for such a method and system that is dynamic with respect to pixel value thresholds so as to increase flexibility in further pixel value analysis and replacement. Moreover, there is a particular need for such methods and systems in sensitive applications, such as surgery.

SUMMARY OF THE INVENTION

The present invention provides methods and systems for improving video and images taken from endoscopic, or other medical and surgical procedures, sports still frames, or other video in which the image recording device, subject, or both are moving independently. An example of an embodiment of the present invention described herein is a method for automatic correction of motion artifacts in an interlaced video image captured by an image recording camera. Such an embodiment may include capturing a complete frame of an interlaced video image, automatically correcting for camera motion, automatically correcting for subject motion, and displaying an image corrected for camera motion and subject motion.

In an embodiment, the method of the present invention involves first determining whether the image has been affected by camera motion. Since an entire image is affected by linear artifacts caused by camera motion, such camera motion artifacts must be removed from the image as a whole before the image can be examined for regional motion. Camera motion is identified and measured using auto-correlation of the odd and even raster fields. A two-dimensional vector is then calculated in order to provide optimal correction for camera motion, after which the even field may be repositioned into its correct location relative to the odd field (or vice versa) to correct for camera motion during the 1/60 second interval between capture of the two fields. This aspect of the invention corrects for situations such as "linear artifact" in which the entire camera itself moves relative to the viewed subject (or vice versa).

In another aspect of the invention, a method is provided for automatically identifying segments within the particular video image that contain subject, or regional, motion artifacts. Such a method of the present invention first determines where in an image subject motion has occurred. This may be done by convoluting the three red-green-blue (RGB) color components of the odd field to compute or predict an even field. Differences between the measured even field and the predicted even field indicate regions of motion within the image field. When the difference between the predicted even field and actual even field is small, the difference can be attributed to subject detail and is left uncorrected. When the difference between the predicted even field and the actual even field is large, subject, or regional, motion within the image field is identified.

The region of the image to which correction needs to be applied is then determined. One method of determining the region for correction is to form a subject motion map. In one implementation, a subject motion map may be generated by squaring the differences between predicted even fields and actual even fields. Squaring the differences in pixel values between fields eliminates any positive or negative direction associated with those values, and makes the result less sensitive to small errors. The resulting subject motion map may then be compared to a threshold to create a binary image delineating the region of the image in which regional motion artifacts have occurred.

Identified regional subject motion is then corrected. In one method, correction can be accomplished by computing the even field from the odd field in the region of the image where the subject motion map indicates low even field prediction accuracy. By comparing identified regions of local artifact to the number of neighboring pixels above a set luminescence threshold, unwanted pixels may be eliminated one at a time.

Each region in the subject motion map where unwanted pixels have been eliminated may then be replaced but without the blurring caused by regional motion artifacts. In one method, auto-correction replacement for eliminated pixels can be accomplished by detecting adjacent pixels in two different directions. Such a two dimensional vector computed from non-blurred pixels at the boundaries of eliminated subject motion regions can be used to adjust the map by translating a sharp image therefrom into the region of subject motion.

A finished, corrected image can then be computed. In one method according to the present invention, a finished, corrected image is computed by using the adjusted map to indicate where to modify the original NTSC frame. Selective correction of the original frame may be accomplished by computing an even raster from the odd raster where the map indicates subject motion is greatest. After a finished image, automatically corrected for both camera motion and regional motion, is computed, the image is displayed for viewing.

One advantage of embodiments of the present invention is that motion artifacts, whether linear or regional, are automatically corrected. An advantage of regional field synthesis duplication as in the present invention is that there are no visible edge effects in the viewed image. In other words, regions of subject motion have smooth edges, rather than the jagged edges that often result from over-correcting.

Another advantage of automatically correcting only for regions that need correction as in the present invention is a high resolution image. Pure regional field duplication results in the loss of some image detail from discarding the even raster pixels in the region of subject motion. Yet, in embodiments of the present invention, because pixels are discarded only in the regions needed, much fewer pixels are discarded than in systems that discard an entire field of pixels. Thus, the method and system of the present invention provide a flexible means for automatic correction of motion artifacts in highly magnified videos that result in the highest resolution-quality picture.

Embodiments of this invention automatically detect the type of artifact encountered in a captured frame on a pixel by pixel basis. Systems according to the present invention automatically identify whether the motion artifact is linear artifact caused by relative camera movement or regional artifact in the image field caused by subject (surgical instrument or patient) movement. By utilizing different parameters for detecting different types of motion, corrective action is taken only for that type of motion detected.

After automatically identifying the type of artifact, embodiments of this invention then automatically correct the frame image using the correct compensation for the particular artifacts encountered on each pixel of the frame. These benefits avoid any need by the surgeon to determine at the time of video capture whether motion correction is needed, and thus avoid prolonging surgical procedure time. In addition, an advantage of this system is that it allows the surgeon to capture still images without having to concentrate on assuring that the camera, the surgeon, surgical tools, and the patient are all still at the same instant each time an image is captured. Images can be captured essentially at random without concern for motion artifacts caused by movement of any of these potential sources of artifacts.

Another advantage of the present invention is that embodiments can be used in the operating room, eliminating the time otherwise required to make post-procedure image corrections. Non-automatic motion correction procedures typically involve the surgeon manually editing captured images by manipulating images with functions such as "motion up" and "motion down." The automatic correction for motion artifacts of this invention eliminates any need for manual editing.

Further, the minimal time required to apply the automatic motion correction of go this invention renders practical real-time image correction. This process can be applied, in real-time, using dedicated image processing equipment with the process implemented in dedicated circuitry or special purpose computational elements. Alternatively, this process can be applied by using a general purpose computer to compute corrections for motion artifacts using the process implemented in software.

Methods and systems for automatic motion correction according to the present invention may be used in a wide variety of applications in which video and images are taken from endoscopic or other surgery, sports still frames, or other video in which the camera and subject are moving independently. The present invention may be used with various video signal formats, including NTSC, PAL, and other sources of interlaced video signals.

Therefore, the method and system of the present invention provide for automatic motion correction in video and images in which the camera, subject, or both move independently that results in a high quality-resolution image. This is accomplished by maintaining primary information from both raster fields in an interlaced frame. The method and system of the present invention automatically and differentially detect linear motion artifacts caused by camera movement and regional motion artifacts caused by movement of surgical tools or the patient within the image field, both types of motion which may be occurring simultaneously. Using the method and system of the present invention, each type of motion artifact may be automatically and differentially corrected.

Those of ordinary skill in the art will appreciate the advantages and features of the present invention as described above and as is apparent from the detailed description below.

DETAILED DESCRIPTION

Figure 1:
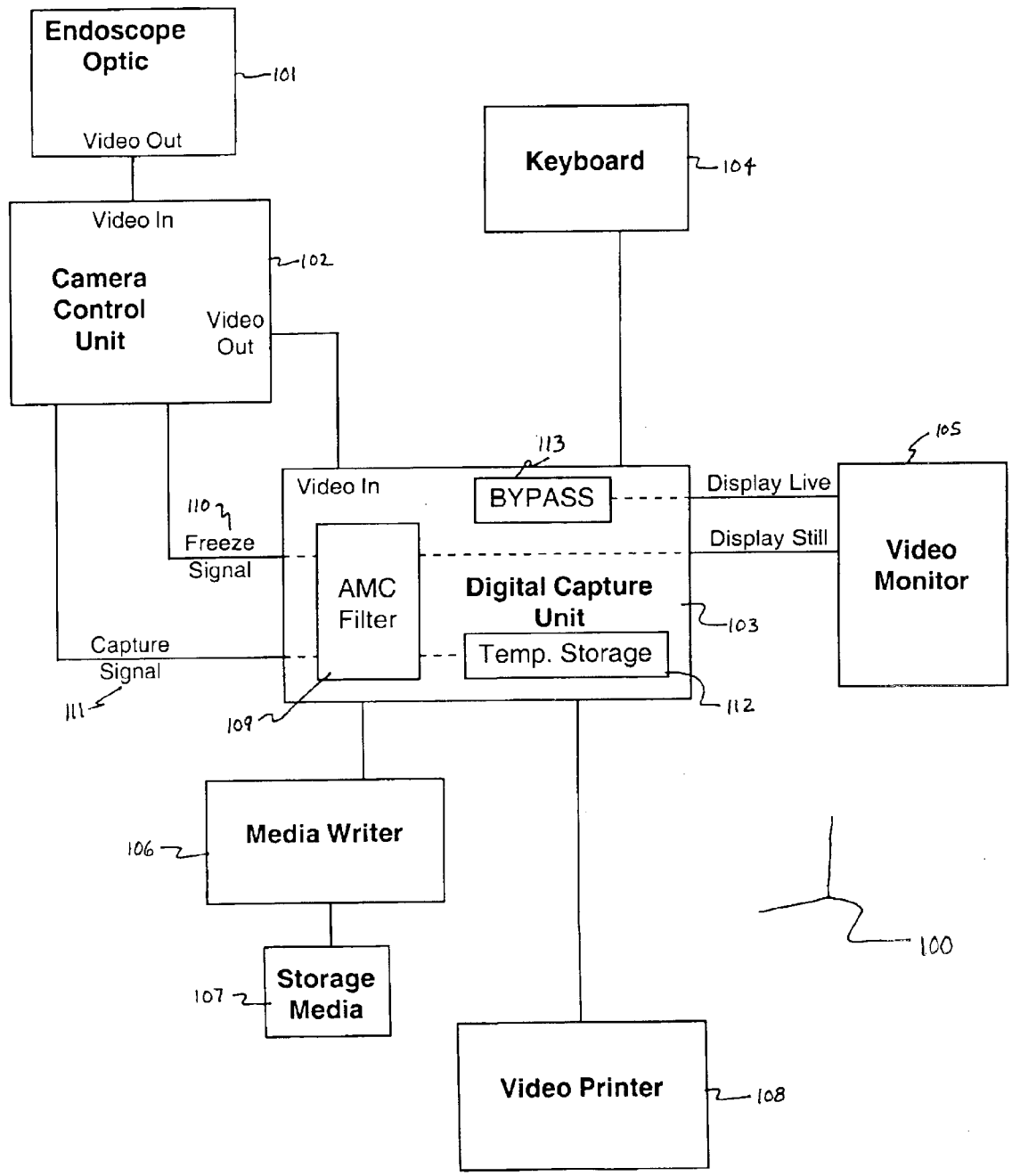
FIG. 1 is a schematic diagram illustrating a system for practicing automatic motion correction of the present invention.
Figure 2:
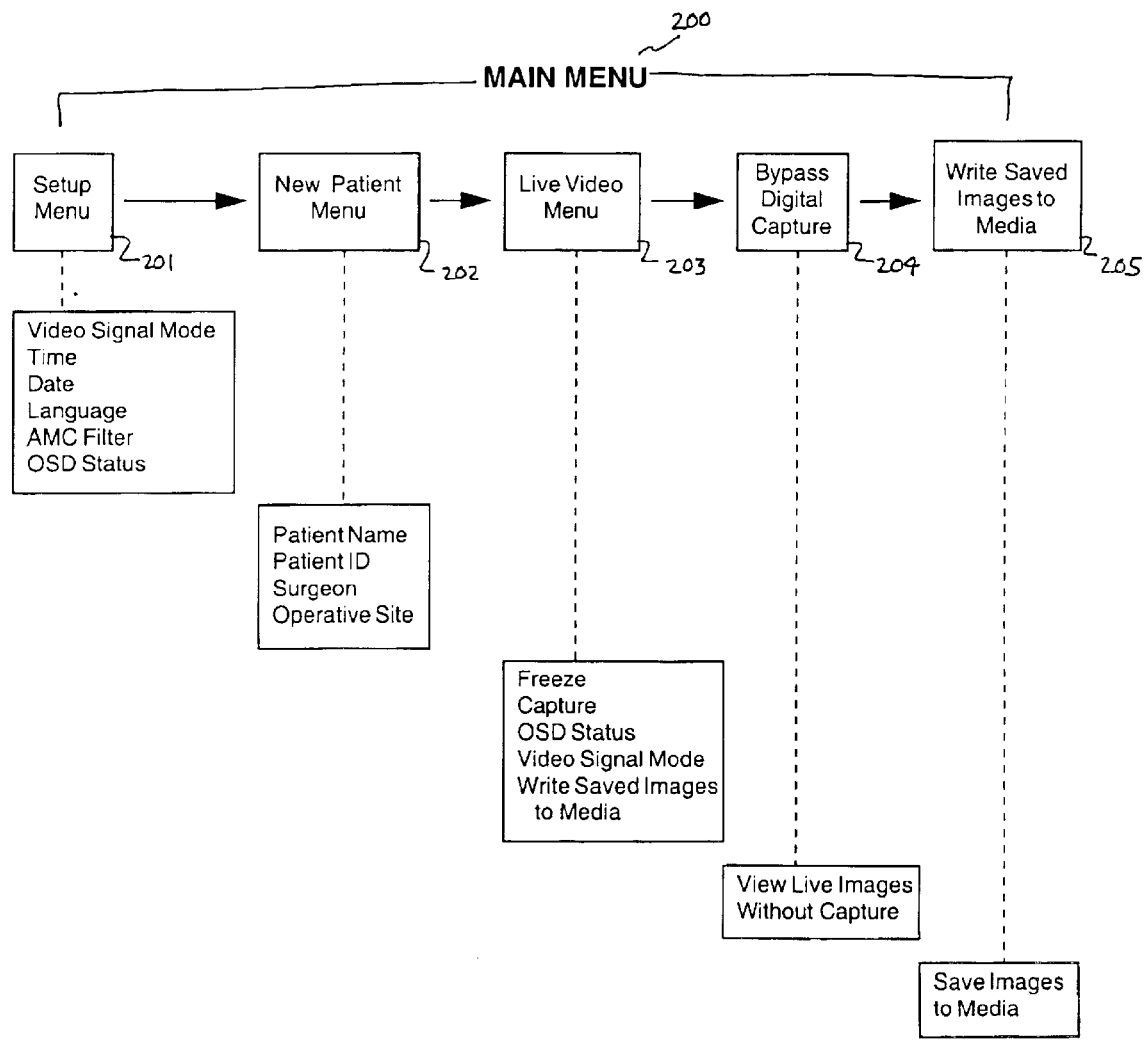
FIG. 2 is a flow diagram illustrating operation of an embodiment implementing the automatic correction system of the present invention.

Methods and systems for automatic motion correction according to the present invention may be used in a variety of applications. Examples of applications include video and images taken from endoscopic, or other medical and surgical procedures, sports still frames, or other video in which the camera and subject are moving independently. The present invention may be used with various video signal formats, including NTSC, PAL, and other sources of interlaced video signals. In addition, the present invention may be used with a variety of hardware applications.

An example of an embodiment of the present invention is a method for automatic correction of motion artifacts in an interlaced video image captured by an image recording camera. Such an embodiment-includes capturing a complete frame of an interlaced video image, the complete frame having a first raster field interlaced with a second raster field and both fields comprising pixels. Such an embodiment also includes automatically correcting for camera motion, automatically correcting for subject motion, and displaying an image corrected for camera motion and subject motion.

Methods of an embodiment of the present invention also utilize the steps of locating optimal correlation values between pixels in the first and second raster fields and creating a two-dimensional motion vector from such optimal correlation values. To achieve correction for camera motion, this embodiment then creates a synthetic first raster field by duplicating the second raster field in the captured complete frame in a corrected position according to the two-dimensional motion vector.

To accomplish correction for subject motion, methods of an embodiment of the present invention may also utilize the step of computing a subject motion map to identify regions of the captured frame where differences in pixel values between the first and second raster fields are relatively large. From a subject motion map, a binary subject motion location map may be created to delineate regions of the captured frame identifying pixels where the number of neighboring pixels exceeds a pre-determined threshold. In this embodiment, the pixels identified in regions of subject motion may then be eliminated. Pixels eliminated from regions of subject motion may then be replaced, but without blurring, by computing a two-dimensional vector from pixels at the boundaries of eliminated regions. In this embodiment, a finished, corrected image may be created by using the adjusted binary subject motion location map to indicate regions on the captured frame where subject motion is greatest, and computing a corrected second raster field from a corrected first raster field in regions where subject motion is greatest. Methods of the embodiments described above may also utilize the step of displaying the image corrected for camera motion and subject motion on a video monitor.

In an application of the present invention in endoscopic surgery, one embodiment uses the "Dyonics® Vision 625 Digital Capture System" by Smith & Nephew, Inc. of Andover, Mass. The "Dyonics® Vision 625 Digital Capture System" ("Dyonics® Vision 625") is designed to be used in the operating room to digitally capture intra-operative images. Images are stored in standard image file format on transportable media for long term archival, retrieval, or printing.

An embodiment of automatic motion correction for video images according to the methods and systems of the present invention is described using the "Dyonics® Vision 625," for example, in endoscopic surgery, in the steps below. FIGS. 14, in particular, depict operation of such an embodiment for practicing automatic motion correction as in the present invention.

1. Capture a Complete Frame (Frame 1).

Figure 5:
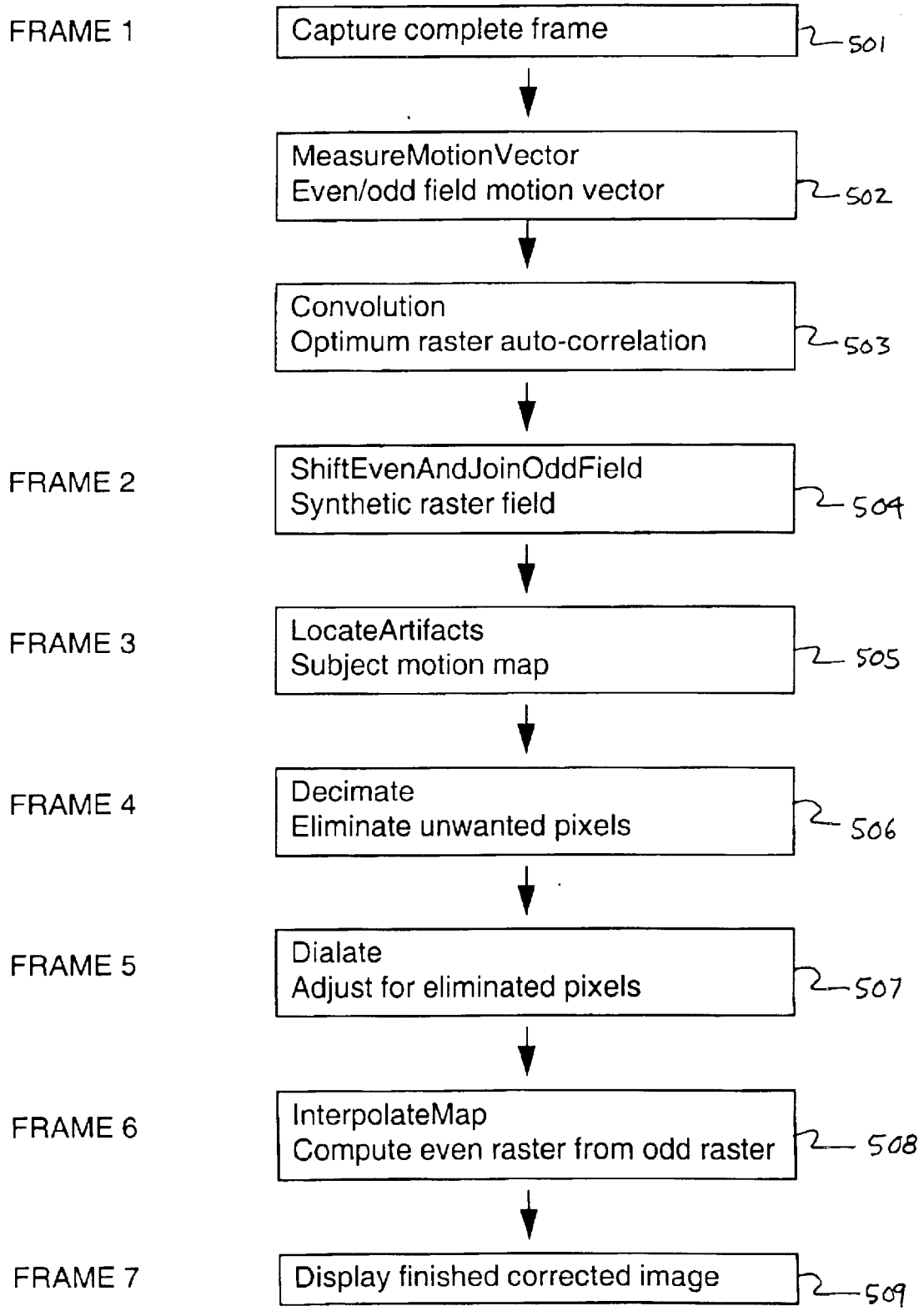
FIG. 5 is a more detailed flow diagram illustrating methods for automatic motion correction of the present invention as embodied in the system depicted in FIG. 4, also showing steps to achieve automatic correction for camera motion and automatic correction for subject motion.

The methods and system of automatic motion correction of the present invention operate on an interlaced video image comprising a complete frame having both even and odd fields captured. Referring to FIG. 5, for example, a complete NTSC frame 501 may be captured using a standard video capture device. In an embodiment using the "Dyonics® Vision 625" system 100, endoscope optic 101, as seen in FIG. 1, detects a video image in which both camera motion and regional subject motion are automatically detected and corrected. Referring to FIG. 1, an interlaced video signal is transmitted from endoscope optic 101 through camera control unit 102 to digital capture unit 103, where a full frame, interlaced video image is captured.

Figure 3:
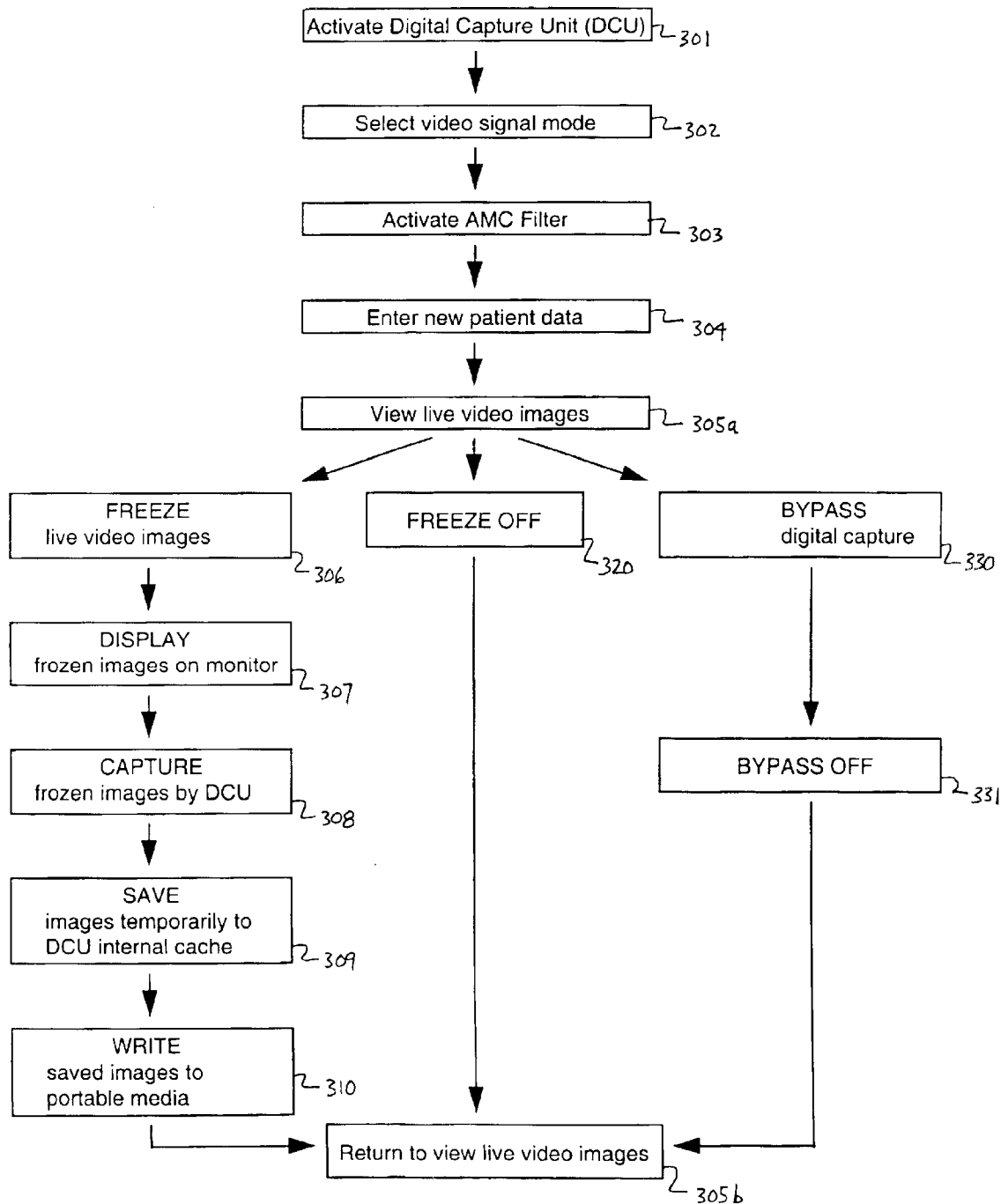
FIG. 3 is a more detailed flow diagram illustrating options for applying an automatic correction system of the present invention in operation of the embodiment depicted in FIG. 2.

Digital capture unit 103 may have a keyboard 104 attached, which may be used to activate various modalities of the system, such as "freeze" and "capture," as seen at references 306 and 308, respectively, in FIG. 3. Live video images detected by endoscope optic 102 may be viewed (305a, 305b) as displayed on video monitor 105. In operation, the surgeon may activate a "freeze" signal 110 at the camera control unit 102 to freeze (306) a live video image (305a) and display the frozen image (307) on video monitor 105. As the surgeon views a live image (305a), the image may be captured by activating a "capture" signal at the camera control unit 102, the image being saved (309) to the internal temporary storage 112 of digital capture unit 103. By activating "bypass" mode 330, the digital capture unit 103 is deactivated, or suspended from application to the live video images being viewed, and live images are displayed directly on video monitor 105.

Automatic correction for camera motion 405 and automatic correction for regional subject motion 406, depicted in greater detail in FIG. 5, are operationalized by Automatic Motion Correction (AMC) Filter 109 of the embodiment shown in FIG. 1. Automatic correction for both camera motion and for regional subject motion are described below.

2. Perform Auto-Correlation on a First Raster Field with Respect to a Second Raster Field (Frame 1).

Figure 6:
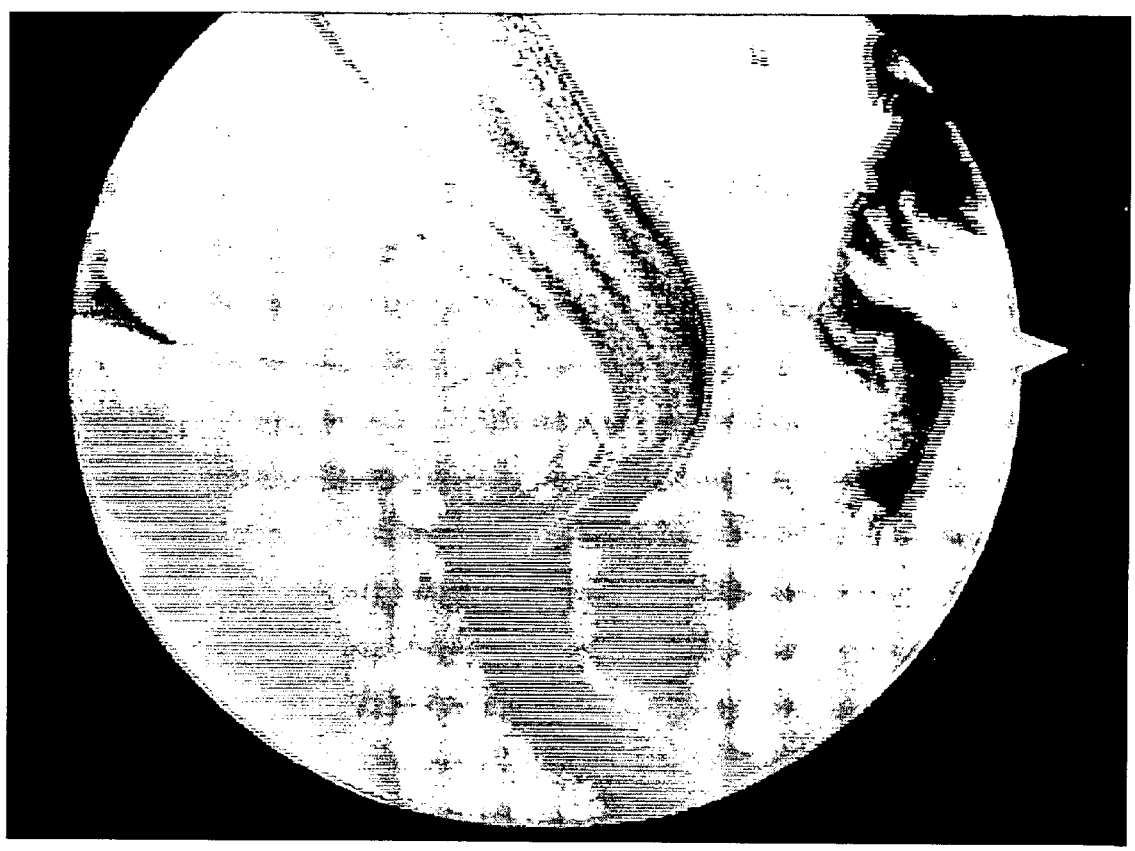
FIG. 6 is a photograph depicting image distortion due to linear artifacts caused by camera motion.

The first automatic motion correction performed by the methods and system of the present invention is for camera motion. FIG. 6 illustrates image distortion due to linear artifacts caused by camera motion. Correction for camera motion is accomplished by performing auto-correlation on a first raster field, either the even field or the odd field, with respect to the second raster field, the complementary field to the first field, in the captured frame. The auto-correlation function results in a "motion vector." Using the "Dyonics® Vision 625" system, the auto-correlation motion vector is computed by performing the function ""MeasureMotionVector" 502 in FIG. 5.

MeasureMotionVector" 502 outputs two values through the argument list SkewX and SkewY. To save time, the algorithm uses an iterative search procedure, minimizing a 3×3 convolution. The best-fit location of the 3×3 result matrix is used to search at a new position until an optimal match is found, or the first raster is determined to be greater than 15 pixels offset from the second raster. "MeasureMotionVector" 502 calls one subroutine, "Convolution" 503. The purpose of "Convolution" is to save results from successive computations to eliminate duplication of computations already performed in previous searches for the optimum auto-correlation point. Generally, "ConvolveAt" is a mathematical technique that compares two images by generating a single number for each of various X and Y points indicative of the quality of the fit of each test pixel in one raster relative to the reference pixel in the other raster.

In the present invention, "ConvolveAt" convolves the difference of all pixels between the odd and even rasters for a specified offset. When the specified offset is zero for both X and Y, the same pixels in both rasters are compared to each other. When the offset is one X and zero Y, the even raster pixel to the right of the same pixel in the odd raster is compared. The convolution in "ConvolveAt" measures the sum of the square of the differences between the rasters at the specified offset. The optimum auto-correlation between the odd and even rasters is the value of X and Y which produces a minimum difference between the two rasters. By determining the optimum auto-correlation points for shifting the test image relative to a reference image, convolution creates as sharp a full-frame image as possible. The convolution step corrects for linear artifacts caused by camera motion, as shown by reference 405 in FIG. 4. Yet, image differences between the two raster fields due to regional artifacts may still be present at this point.

The following algorithm applies to auto-correlation on a first raster field with respect to a second raster field. However, as will be apparent to those of ordinary skill in the art, the automatic motion correction method and system of the present invention are also readily utilized in applications that do not employ this convolution technique.

```
void MeasureMotionVector(unsigned char *Fields, long *SkewX,
long *SkewY)
{
unsigned long Data[33][33] = {0};
int x, y, NextX, NextY;
unsigned long Center, t, l, b, r;
double Szy2, Szy, Sz, A, B, DeltaY;
NextX = 0;           // kick start value!
x = 1;        //kickstartvalue!
NextY = y = 0;
while((x != NextX) || (y != NextY))
```

-continued

```
{
    x = NextX;
    y = NextY;
    Center = Convolution(Data, Fields, x, y);
    t = Convolution(Data, Fields, x, y-1);
    l = Convolution(Data, Fields, x-1, y);
    b = Convolution(Data, Fields, x, y+1);
    r = Convolution(Data, Fieds, x+1, y);
    if(Center > t)
    {
        NextX = x;
        NextY = y-1;
        Center = t;
    }
    if(Center > l)
    {
        NextX = x-1;
        NextY = y;
        Center = l;
    }
    if(Center > b)
    {
        NextX = x;
        NextY = y+1;
        Center = b;
    }
    if(Center > r)
    {
        NextX = x+1;
        NextY = y;
    }
    Center = Convolution(Data, Fields, x, y);
    if(x = = 15) break;
    if(x = = -15) break;
    if(y = = 15) break;
    if(y = = -15) break;
    if(lCenter && lt && lb)
    {
        *SkewX = 0;
        *SkewY = 0;
        return;
    }
}
// using least squares, interpolate Y from t(op), Center, and b(ottom)
// note: Center is at zero pixels offset, t is -2 and bottom is 2
// using notation: z is a function of y... and the 2nd order poly
    coefficients a, b, c
// where z = ay^2 + by + c
// f(a, b, c) = Sigma(((ay^2 + by + c) - z)^2);
// minimize f(a,b,c)
// take partial derivatives:
// df/da = 2 Sigma yy((ayy + by + c) - z)
// 1a) df/da = 2 Sigma (ay^4 + by^3 + cy^2 - zy^2)
// df/db = 2 Sigma y((ayy + by + c) - z)
// 2a) df/db = 2 Sigma (ay^3 + by^2 + cy - zy)
// 3a) df/dc = 2 Sigma (ay^2 + by + c - z)
// setting the partials to zero to find the minima...
// 1b) Sigma zy^2 = aSigma y^4 + bSigma y^3 + cSigma y^2
// 2b) Sigma zy = aSigma y^3 + bSigma y^2 + cSigma y
// 3b) Sigma zz = aSigma y^2 + bSigma y^1 + nc(note n=3)
// compute the matrix coefficients:
Szy2 = t * 4.0 + Center * 0.0 + b * 4.0;
Szy = t * -2.0 + Center * 0.0 + b * 2.0;
Sz = (double)t + (double)Center + (double)b;
// Sy4 = 32 = 16.0 + 0.0 + 16.0;
// Sy3 = 0 = -8.0 + 0.0 + 8.0;
// Sy2 = 8 = 4.0 + 0.0 + 4.0;
// Sy = 0 = -2.0 + 0.0 + 2.0;
// the matrix is:
// 1c) Szy2 = a*32.0 + b*0.0 + c*8.0
// 2c) Szy = a*0.0 + b*8.0 + c*0.0
// 3c) Sz = a*8.0 + b*0.0 + c*3.0
// To find the y location of the
// parabolic vertex: minimize dz/dy = 2aDeltaY + b
// so DeltaY = -b/2a, therefore we only need to
    solve the matrix for a and b.
// from eqn 2c:
B = Szy/8.0;
// now with two eqns in 2 unknowns:
// 1d) Szy2 = a*32.0 + c*8.0
// 3d) Sz = a*8.0 + c*3.0
// normalize c
// 1e) Szy2/8.0 = a*32.0/8.0 + c
// 3e) Sz/3.0 = a*8.0/3.0 + c
// rearrange
// 1f) Szy2/8.0 - a*32.0/8.0 = c
// 3f) Sz/3.0 - a*8.0/3.0 = c
// solve for a:
// Szy2/8.0 - a*32.0/8.0 = Sz/3.0 - a*8.0/3.0
// Szy2/8.0 - Sz/3.0 - a*32.0/8.0 = -a*8.0/3.0
// Szy2/8.0 - Sz/3.0 = a*32.0/8.0 - a*8.0/3.0
// Szy2/8.0 - Sz/3.0 = a*(32.0/8.0 - 8.0/3.0)
// (Szy2/8.0 - Sz/3.0)/(32.0/8.0 - 8.0/3.0);
A = (Szy2/8.0 - Sz/3.0)/(32.0/8.0 - 8.0/3.0);
// so finally:
DeltaY = -B/(2.0 * A);
// report the results to the calling function
*SkewX = -x;
*SkewY = -y*2 - DeltaY*2;        // round instead if truncate
}
unsigned long Convolution(unsigned long Data[33][33],
        unsigned char *Fields, long x, long y)
{
// already computed?
if(Data[y+16][x+16])
    return Data[y+16][x+16];
Data[y+16][x+16] = ConvolveAt(Fields+640*3*240, Fields, x, y);
return Data[y+16][x+16];
}
unsigned long ConvolveAt(unsigned char*Odd,
unsigned char*Even, long x, long y)
{
long i,j, Sigma = 0;
x += 16;
y += 16;
Odd += 16 * 640 * 3 + 16 * 3;
Even += y * 640 * 3 + x * 3;
for(i=0; i<240-33; i++)
    {
        j = (640-33)*3;
        while(j-)
        {
            Sigma += (*Odd - *Even) * (*Odd - *Even);
            Odd++;
            Even++;
        }
        Odd += 33*3;
        Even += 33*3;
    }
return Sigma;
}
```

3. Create a Synthetic First Raster Field by Duplicating the Second Raster Field and Then Placing the Synthetic First Raster Field into Its Corrected Position (Frame 2).

Figure 7:
FIG. 7 is a photograph of the image of FIG. 6 after automatic motion correction of camera motion linear artifacts.

To complete automatic motion correction for camera motion, an intermediate frame, substantially transparent to the human eye, is created. FIG. 7 illustrates the image of FIG. 6 after automatic correction of linear artifacts due to camera motion. This intermediate frame comprises a raster with a synthetic first raster field generated by duplicating the second raster field and then placing the synthetic first raster field into its corrected position. In an embodiment of the methods and system of the present invention, using the "Dyonics® Vision 625" system, such a synthetic field is generated and placed into its corrected position by automatically running the "ShiftEvenAndJoinOddField" function 504, as depicted in FIG. 5. The function "ShiftEvenindJoinOddField" 504 replaces the even field in the NTSC frame at the offset determined by the function "MeasureMotionVector" 502. The following algorithm applies to a process of creating a raster with a synthetic field.

```
void ShiftEvenAndJoinOddField(unsigned char *Fields, long x, long y,
unsigned char *RawImage)
{
unsigned char *Odd, *Even, *WorkingImage;
long i, n, Lines, Skip, Shift, Width;
// blindly fill both rasters with odd
WorkingImage = RawImage;
Even = Odd = Fields + 640*3 * 240;
for(i=0; i<240; i++)
        {
        n = 640*3;
        while(n--)
                *WorkingImage++ = *Even++;
        n = 640*3;
        while(n--)
                *WorkingImage++ = *Odd++;
        }
// compute refill values...
if(y>0)
        {
        Lines = 240-y/2;
        Even = Fields;
        WorkingImage = RawImage + 2*640*3*(y/2);
        }
else
        {
        Lines = 240+(y-1)/2;
        Even = Fields + 640*3*(-(y-1)/2);
        WorkingImage = RawImage;
        }
if(y%2)
        {
        WorkingImage += 640*3;            // exchange
        }
if(x>0)
        {
        Skip = (640+x)*3;
        Shift = x*3;
        Width = (640-x)*3;
        WorkingImage += Shift;
        }
else
        {
        Skip = (640-x)*3;
        Shift = -x*3;
        Width = (640+x)*3;
        Even += Shift;
        }
// now join the rasters...
for(i=0; i<Lines; i++)
        {
        n = Width;
        while(n--)
                *WorkingImage++ = *Even++;
        WorkingImage += Skip;
        Even += Shift;
        }
}
```

4. Compute a Subject Motion Map (Frame 3).

Figure 8:
FIG. 8 is a photograph depicting image distortion due to camera motion and regional subject motion, as identified by a subject motion map.

FIG. 8 illustrates image distortion due to camera motion and regional subject motion. After camera motion is automatically corrected according to the methods and system of the present invention, regional subject motion can then be automatically detected and corrected, as shown at reference 406 in FIG. 4. Referring to FIG. 5, regional subject motion can be automatically detected by computing a subject motion map, which comprises another transparent, or non-viewable, intermediate frame, Frame 3. Subject motion can be found anywhere in an image after camera motion effects are removed. The function "LocateArtifacts" 505, using the "Dyonics® Vision 625" system, for example, looks for the results of subject motion in the difference between even and odd rasters. To compute the difference between the "expected" even pixel value and the actual even pixel value, the "LocateArtifacts" 505 function uses reference images of the convolution kernel:

0 1 0
0 -20
0 1 0.

However, any equivalent convolution kernal could be used, such as:

1 0 1
0 40
1 0 1 or 1 1 1
0 -60
1 1 1

The kernal is chosen for speed of execution. The three active terms are adequate because the even raster of the image already has the greatest possible correlation to the odd raster because of the processes described above to create a raster with a synthetic field 504 and placing the synthetic field into its corrected position (frame 2).

"LocateArtifacts" 505 convolves the NTSC frame "Color Raster" to produce a half height grayscale image in 'Diff'. The following algorithm applies to the process for computing a subject motion map.

```
int absdif(int x, int y)
{
int z;
z = x - y;
return z < 0 ? -z : z;
}
// color raster is 640x480x3 Diff is 640x240x1
void LocateArtifacts(unsigned char *ColorRaster, unsigned char *Diff)
{
unsigned char *Top, *Center, *Bottom;
int y, x, c;
unsigned int Avg, DTB;
int Delta;
for(y=0; y<480; y += 2)
        {
        Top = ColorRaster + y * 640*3;
        Center = Top + 640*3;
        Bottom = Center + 640*3;
        x=640;
        while(x--)
                {
                Delta = 0;
                c=3;
                while(c--)
                        {
                        DTB = absdif(*Top, *Bottom);
                        Avg = *Top++;
                        Avg += *Bottom++;
                        Avg /= 2;
                        Delta += absdif(Avg, *Center++);
                        Delta -= DTB/2;
                        }
                Delta -= 15;
                if(Delta < 0) Delta = 0;
                Delta *= Delta;
                *Diff++ = Delta < 256 ? Delta : 255;
                }
        }
}
```

5. Establish a threshold Difference and Eliminate Unwanted Pixels in Frame 3 to Create a Binary Subject Motion Location Map (Frame 4).

After a subject motion map is computed, a binary subject motion location map is generated to correct for regional motion artifacts by eliminating undesired pixels and yet preserve actual detail in the affected region. In the methods and system of the present invention, using the "Dyonics® Vision 625" system embodiment, for example, a binary subject motion location map is generated by the function "Decimate" 506 (FIG. 5). The function "Decimate" 506 compares each pixel in the grayscale image "map" to a threshold difference determined by experimenting with a large number of images. In practical application using the convolution kernal in "LocateArtifacts" 505, a threshold difference anywhere from about 20 to about 150 IRE brightness units works well. A preferred final average threshold difference value is 80 IRE units.

"Decimate" 506 performs binary decimation on the subject motion map to is eliminate hairline signals resulting from high image detail. Decimation eliminates wanted pixels one at a time, and is performed by first counting the number of neighboring pixels exceeding the threshold. If more than three neighboring pixels in the subject motion map are above the threshold, the pixel is not decimated. If three or less neighboring pixels in the subject motion map are above the threshold, the pixel is eliminated. As such, local detail is preserved, while motion artifacts caused by surgical tool or patient movement is corrected. The following algorithm applies to the process of decimation to create a binary subject motion location map.

```
void Decimate(unsigned char *Map)
{
    int Total, Count = 640 * (240 - 2) - 2;
    unsigned char *Previous, *Current, *Next;
    unsigned char Threshold = 80;
    Previous = Map;
    Current = Previous + 640;
    Next = Current + 640;
    while(Count--)
        {
        Total = 0;
        Total += Previous[-1] < Threshold ? 0 : 1;
        Total += Previous[0] < Threshold ? 0 : 1;
        Total += Previous[1] < Threshold ? 0 : 1;
        Total += Current[-1] < Threshold ? 0 : 1;
        Total += Current[1] < Threshold ? 0 : 1;
        Total += Next[-1] < Threshold ? 0 : 1;
        Total += Next[0] < Threshold ? 0 : 1;
        Total += Next[1] < Threshold ? 0 : 1;
        *Current = Total < 3 ? 0 : *Current;   // leave alone
        Previous++;
        Current++;
        Next++;
        }
}
```

6. Adjust the Binary Subject Motion Location Map (Frame 5).

After establishing a threshold and decimating unwanted pixels to create a binary subject motion location map in intermediate frame 4 in the previous step, the binary map image is adjusted in a subsequent intermediate frame to replace decimated areas but without the blurring caused by motion artifacts. In the methods and system of the present invention, using the embodiment of the "Dyonics® Vision 625" system, for example, the map is "dialated" to identify pixels near the boundaries of regions eliminated due to subject motion artifacts. Pixels near the boundaries are most likely to be affected by similar subject motion. The "Dialate" routine 507 (FIG. 5) replaces decimated areas but without the blurring caused by regional motion artifacts. The "Dialate" routine 507 works in similar fashion to the "Decimate" routine 506, except the effect is to "spread" the map out one pixel each time the routine is called. A two-dimensional vector is computed by detecting pixels in two directions, one pixel at a time, adjacent to pixels identified at the boundaries of eliminated regions. Pixels eliminated within regions of subject motion are then replaced with the two-dimensional vector to create a corrected image having smooth edges. The "Dialate" routine 507 is automatically run twice to enhance image sharpness. The following algorithm applies to the process for adjusting the map at pixels near the threshold.

```
void Dialate(unsigned char *Map)
{
    int Total, Count = 640 * (240 - 2) - 2;
    unsigned char *Previous, *Current, *Next;
    unsigned char Threshold = 80;
    Previous = Map;
    Current = Previous + 640;
    Next = Current + 640;
    while(Count--)
        {
        Total = 0;
        Total += Previous[-1] < Threshold ? 0 : 1;
        Total += Previous[0] < Threshold ? 0 : 1;
        Total += Previous[1] < Threshold ? 0 : 1;
        Total += Current[-1] < Threshold ? 0 : 1;
        Total += Current[1] < Threshold ? 0 : 1;
        Total += Next[-1] < Threshold ? 0 : 1;
        Total += Next[0] < Threshold ? 0 : 1;
        Total += Next[1] < Threshold ? 0 : 1;
        *Current = Total > 4 ? 255 : *Current;   // leave alone
        Previous++;
        Current++;
        Next++;
        }
}
```

7. Compute a Finished, Corrected Image (Frame 6).

Figure 9:
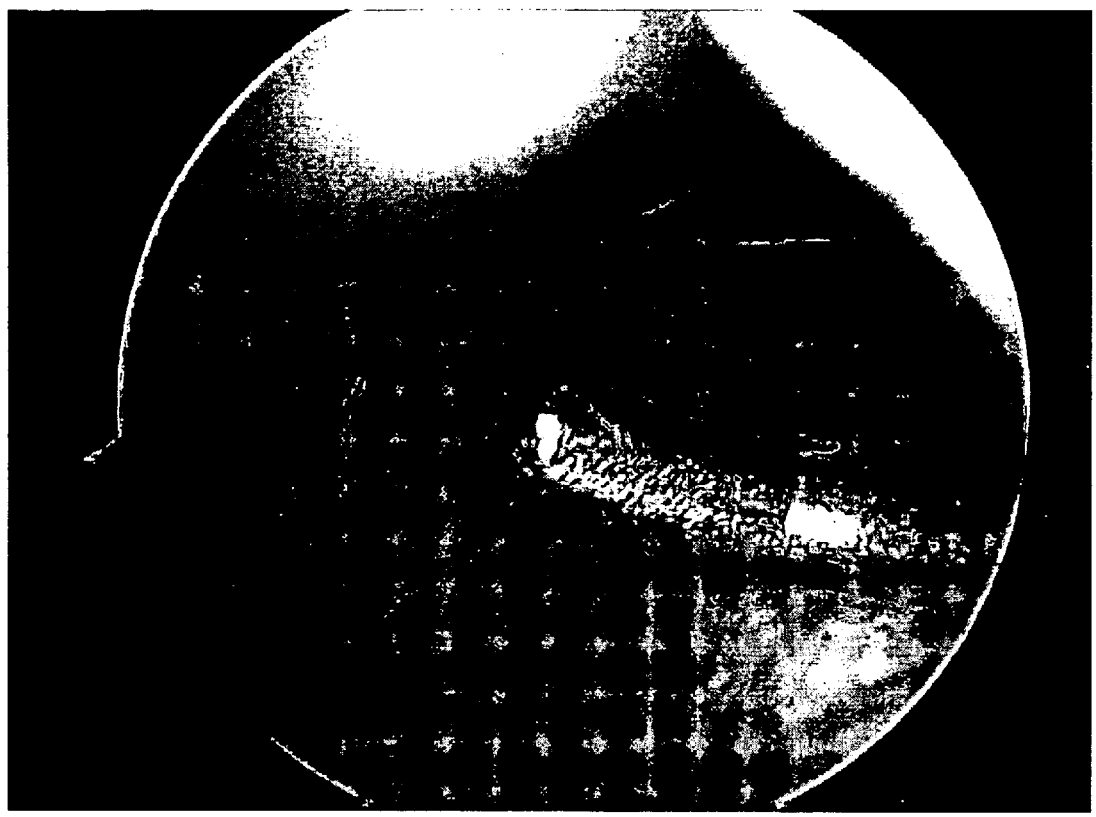
FIG. 9 is a photograph of the image of FIG. 8 after automatic motion correction for camera motion and automatic correction for regional subject motion.

After the binary subject motion location map image is adjusted by replacing decimated areas but without blurring caused by regional motion artifacts, a finished, corrected image is computed. A finished, corrected image is computed by using the adjusted map (frame 5) to indicate where to modify the original NTSC frame Color Raster. In the methods and system of the present invention, using the embodiment of the "Dyonics® Vision 625" system, for example, the original frame Color Raster is modified by running the "InterpolateMap" routine 508, as shown in FIG. 5. The "InterpolateMap" routine 508 selectively corrects the Color Raster by computing an even raster from the odd raster where the map indicates subject motion is greatest. That is, local regions of the image field having large amounts of subject motion are selected out for correction. As a result, a sharp finished image is interpolated. FIG. 9 illustrates the image of FIG. 8 after automatic motion correction. The following algorithm applies to a process of selectively correcting the original frame Color Raster to produce a finished image, corrected for both camera motion and regional subject motion.

```
// color raster is 640x480x3 Map is 640x240x1
void InterpolateMap(unsigned char *ColorRaster, unsigned char *Map)
{
    unsigned char *Top, *Center, *Bottom;
    int y, x, c;
    unsigned int Avg, DTB;
    int Delta;
    Top = ColorRaster;
    Center = Top + 640*3;
    Bottom = Center + 640*3;
    y = 240;
    while(y--)
        {
        x = 640;
        while(x--)
```

-continued

```
    {
    if(*Map++ > 128)
        {
            Avg = *Top++;
            Avg += *Bottom++;
            *Center++ = Avg >> 1;
            Avg = *Top++;
            Avg += *Bottom++;
            *Center++ = Avg >>1;
            Avg = *Top++;
            Avg += *Bottom++;
            *Center++ = Avg >> 1;
        }
    else
        {
            Top += 3;
            Center += 3;
            Bottom += 3;
        }
    }
    Top += 640 * 3;
    Center += 640 * 3;
    Bottom += 640 * 3;
    }
}
```

Figure 4:
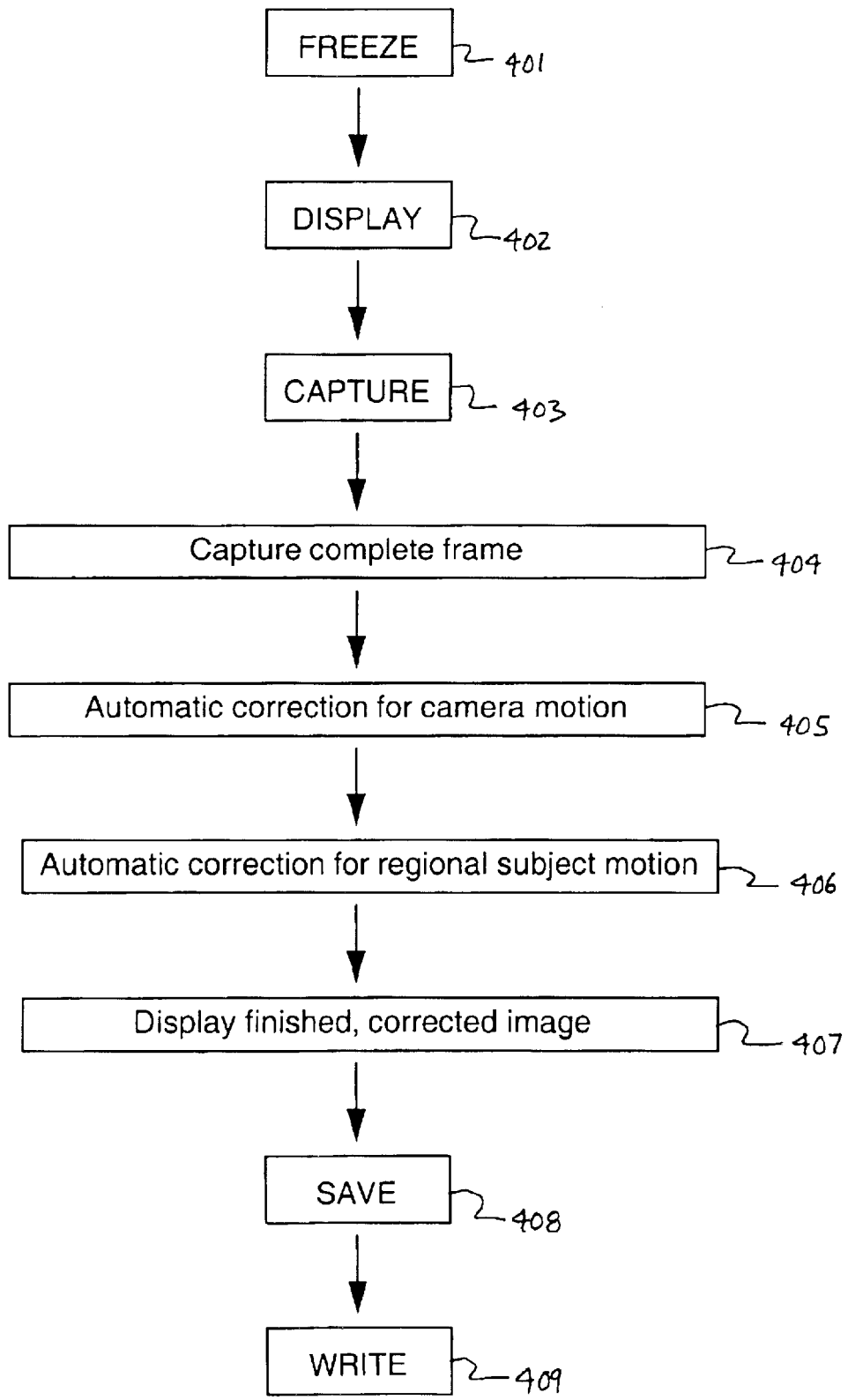
FIG. 4 is a flow diagram illustrating methods for automatic motion correction of the present invention as embodied in the system depicted in FIG. 1.

As a result of operation of steps 505–508 in FIG. 5 (frames 36), the original captured frame (frame 1) is automatically corrected for regional subject motion, as indicated by step 406 in FIG. 4.

8. Display the Finished, Corrected Image (Frame 7).

After a finished image 509 (FIG. 5), automatically corrected for both camera motion and regional subject motion, is computed, the image is displayed for real-time viewing, by the surgeon for example. Images automatically corrected according to the methods and system of the present invention, using the embodiment of the "Dyonic® Vision 625" system, for example, may also be stored in standard image file format on transportable media for long term archival, retrieval, or printing. Referring to FIGS. 1 and 3, as a finished, corrected image (frame 7) is displayed, the image is saved (309) in the internal temporary storage 112, such as an internal cache, of the digital capture unit 103. Corrected images saved in the internal temporary storage 112 may then be written (310) by a media writer 106 for permanent storage onto portable storage media 107. Corrected images may also be printed using a standard video printer 108.

The above embodiment of the present invention has been described in fulfillment of the various objects of the invention. It should be recognized that this embodiment is merely illustrative of the principles of the present invention. Numerous modifications and adaptations thereof will be readily apparent to those skilled in the art without departing from the spirit and scope of the present invention. For example, methods and systems of automatic motion correction of the present invention may be utilized in a variety of video signal applications and with alternative computer hardware modalities. As another example, although algorithms are provided herein that apply to various steps according to the present invention, other algorithms may be employed.

What is claimed is:

1. A method for automatic correction of motion artifacts in an interlaced video image captured by an image recording camera comprising:

capturing a complete frame of an interlaced video image, the complete frame having a first raster field and an interlaced second raster field, the first and second raster fields each having a plurality of pixels and pixels in the first raster field are offset from pixels in the second raster field;

automatically correcting for camera motion, comprising determining whether the captured frame contains camera motion artifacts;

performing auto-correlation on the first raster field with respect to the second raster field by locating optimal correlation values for X/Y coordinates for each pixel in the first raster field relative to a reference pixel in the second raster field using a repeating 3×3 convolution search to create a two-dimensional motion vector between each pixel in the first raster field and the reference pixel in the second raster field;

automatically correcting for subject motion; and displaying an image corrected for camera motion and subject motion.

2. The method of claim 1, wherein using a repeating 3×3 convolution search comprises (a) determining a first correlation value for corresponding pixels in the first and second raster fields when a first specified offset is zero for both X and Y coordinates, (b) determining a second correlation value for a pixel in the first raster field to the right of the corresponding pixel in the second raster field when a second specified offset is one for X and zero for Y, (c) calculating a difference between the first correlation value and the second correlation value, (d) squaring the difference between the values, (e) repeating steps (a), (b), (c), and (d) for all pixels in the first raster field relative to pixels in the second raster field, (f) adding the squares of the differences between correlation values at the first specified offset and at the second specified offset, and (g) determining the correlation values which produce a minimum difference between pixels in the first raster field and the second raster field to provide optimal correlation values for shifting the first raster field relative to the second raster field.

3. The method of claim 1, wherein creating a two-dimensional motion vector comprises locating values for X/Y coordinates for each pixel in the first raster field determined to be offset more than 15 pixels from a reference pixel in the second raster field.

4. A method for automatic correction of motion artifacts in an interlaced video image captured by an image recording camera, comprising:

capturing a complete frame of an interlaced video image, the complete frame having a first raster field and an interlaced second raster field;

automatically correcting for camera motion, comprising locating optimal correlation values for each pixel in the first raster field relative to a reference pixel in the second raster field to create a two-dimensional motion vector between each pixel in the first raster field and the reference pixel in the second raster field;

automatically correcting for subject motion comprising computing a subject motion map to automatically identify regions of subject motion in the captured frame including (a) determining actual pixel values for the first raster field, (b) computing predicted pixel values for the first raster field from the second raster field, (c) comparing the predicted pixel values and the actual pixel values for the first raster field to determine differences between the first and second raster fields in discrete regions of the captured frame, (d) identifying regions of the captured frame where differences between the first and second raster fields are relatively large, and (e) squaring the relatively large differences between the first and second raster fields to generate the subject motion map; and displaying an image corrected for camera motion and subject motion.

5. The method of claim 4, wherein computing a subject motion map further comprises convolving the first and second raster fields of the captured frame to produce a half-height grayscale image map in regions of large differences in the subject motion map, and leaving uncorrected regions of the captured frame where differences between the first and second raster fields are relatively small.

6. A method for automatic correction of motion artifacts in an interlaced video image captured by an image recording camera, comprising:

capturing a complete frame of an interlaced video image, the complete frame having a first raster field and an interlaced second raster field;

automatically correcting for camera motion, comprising locating optimal correlation values for each pixel in the first raster field relative to a reference Pixel in the second raster field to create a two-dimensional motion vector between each pixel in the first raster field and the reference pixel in the second raster field;

automatically correcting for subject motion comprising computing a subject motion map to automatically identify regions of subject motion in the captured frame, wherein automatically correcting for subject motion further comprises creating a binary subject location man to delineate regions of the captured frame for applying correction for subject motion including (a) establishing a threshold difference between the predicted pixel values and the actual pixel values for the first raster field, (b) comparing each pixel in the grayscale image map to the threshold difference, counting the number of pixels exceeding the threshold difference, (c) eliminating from the grayscale image map pixels where three or less neighboring pixels in the grayscale image map are above the threshold difference, and (d) leaving in the grayscale image map pixels where more than three neighboring pixels are above the threshold difference; and displaying an image corrected for camera motion and subject motion.

7. The method of claim 6, wherein the threshold difference is in the range from about 20 to about 150 IRE brightness units.

8. The method of claim 6, wherein the threshold difference is 80 IRE brightness units.

9. The method of claim 6, wherein automatically correcting for subject motion further comprises adjusting the binary subject location map by replacing pixels eliminated from the grayscale image map in regions of subject motion.

10. The method of claim 9, the regions of subject motion having pixels eliminated forming boundaries comprising pixels, wherein adjusting the binary subject location map comprises (a) computing a two-dimensional vector from pixels at the boundaries of eliminated regions of subject motion, (b) replacing pixels eliminated from regions of subject motion with the two-dimensional vector, and (c) repeating steps (a) and (b) by computing the two-dimensional vector at locations one pixel further away from the boundaries of the eliminated regions of subject motion to create a corrected image having smooth edges.

11. The method of claim 10, wherein computing a two-dimensional vector from pixels at the boundaries of eliminated regions of subject motion comprises identifying boundaries of eliminated regions of subject motion, and detecting pixels in two directions, one pixel at a time, adjacent to the pixels at the boundaries.

12. The method of claim 10, wherein automatically correcting for subject motion further comprises computing a finished, corrected image.

13. The method of claim 12, wherein computing a finished, corrected image comprises using the adjusted map to indicate regions on the captured frame where subject motion is greatest, and computing a corrected second raster field from a corrected first raster field in regions on the captured frame where subject motion is greatest.

14. The method of claim 13, further comprising displaying the finished image corrected for camera motion and subject motion.

15. A method for automatic correction of motion artifacts in an interlaced video image captured by an image recording camera, comprising:

capturing a complete frame of an interlaced video image, the complete frame having a first raster field and an interlaced second raster field, the first and second raster fields each having a plurality of pixels;

locating optimal correlation values between pixels in the first raster field and pixels in the second raster field;

creating a two-dimensional motion vector from optimal correlation values;

creating a synthetic first raster field by duplicating the second raster field in the captured complete frame in a corrected position according to the two-dimensional motion vector;

computing a subject motion map to identify regions of the captured frame where differences in pixel values between the first and second raster fields are relatively large;

creating a binary subject location map to delineate regions of the captured frame for applying correction for subject motion;

eliminating from the binary subject location map pixels where the number of neighboring pixels exceeds a predetermined threshold;

adjusting the binary subject location map by replacing eliminated pixels;

computing a finished, corrected image; and displaying the image corrected for camera motion and subject motion.

16. A system for automatic correction of motion artifacts in a live, interlaced video image, the system comprising:

an image recording camera for capturing complete frames of video images, the complete frames each having a first raster field and an interlaced second raster field, each field comprising a plurality of pixels;

a digital capture unit for processing live video images and captured frames of video images;

a first filter for automatically correcting for camera motion comprising (a) a two-dimensional motion vector between each pixel in the first raster field and a reference pixel in the second raster field created by auto-correlation of optimal correlation values for each pixel in the first raster field relative to the reference pixel in the second raster field, and (b) a synthetic first raster field created by duplicating the second raster field in a corrected position in the captured complete frame according to the two-dimensional motion vector;

a second filter for automatically correcting for subject motion comprising (a) a subject motion map computed to identify regions of subject motion, a binary subject motion map for eliminating pixels in the regions of subject motion, (b) an adjusted binary subject motion map, the binary subject motion map adjusted by replacing eliminated pixels, and (c) a corrected captured frame, the frame corrected by computing a corrected second raster field in regions where subject motion is greatest; and a video monitor for displaying images.

* * * * *

UNITED STATES PATENT AND TRADEMARK OFFICE
CERTIFICATE OF CORRECTION

PATENT NO. : 6,842,196 B1
DATED : January 11, 2005
INVENTOR(S) : Dana Swift and Larry Birdsill Page 1 of 1

It is certified that error appears in the above-identified patent and that said Letters Patent is hereby corrected as shown below:

Column 7,
Lines 26-27, "FIGS. 14" should be replaced with -- FIGS. 1-4 --.

Column 10,
Line 14, "// (Szy2/8.0 - Sz/3.0)/(32.0/8.0 - 8.0/3.0);" should read
-- // (Szy2/8.0 - Sz/3.0)/(32.0/8.0 - 8.0/3.0) = a --.

Column 13,
Line 11, "wanted" should be replace with -- unwanted --.

Column 15,
Line 26, "frames 36" should be replaced with -- frames 3-6 --.
Line 61, a comma should be inserted after "camera" and before "comprising."

Column 17,
Line 24, "Pixel" should be replaced with -- pixel --.
Line 32, "man" should be replaced with -- map --.

Column 20,
Line 8, -- from the first raster field -- should be inserted after "field."

Signed and Sealed this

Thirty-first Day of May, 2005

JON W. DUDAS
*Director of the United States Patent and Trademark Office*